Dec. 27, 1955     C. M. CAMP     2,728,163
MINNOW TRAPS
Filed Jan. 5, 1951

INVENTOR
Carl M. Camp
BY

2,728,163

MINNOW TRAPS

Carl M. Camp, Checotah, Okla.

Application January 5, 1951, Serial No. 265,125

1 Claim. (Cl. 43—100)

This invention relates to a minnow trap, and defines an improvement over my co-pending application Serial No. 173,379, filed July 12, 1950, now abandoned, entitled "Minnow Trap."

In the above mentioned application, the trap comprises a transparent body provided with at least one opening in diametrically opposite walls, each opening having secured thereto a funnel extending into the body, with the inner end of each funnel extending beyond the longitudinal center line of the body, and the inner ends being disposed in different planes, thus providing a tortuous path, so to speak, within the body. This trap was primarily for use as a floating trap.

The present trap is primarily what may be termed a "still water" trap, that is to say a trap which rests on the bed of a stream, pond and the like, the trap being provided with a plurality of inlet openings defined by hollow frusto-conical elements, the inner ends of the hollow elements being located in different planes, thereby providing a plurality of entrance pathways into the body portion and at the same time serving to prevent the exit of the minnows from the interior of the body portion. The body portion and the hollow frusto-conical elements are of a transparent material such as glass, the body portion and hollow frusto-conical elements being integrally formed, thereby enabling the device to be manufactured in a single operation.

The upper end of the body portion is provided with an opening adapted to be closed by any suitable means such as a closure cap.

To employ the trap in still water, cracker crumbs, oatmeal, bread and the like are deposited within the trap, after which the closure cap is secured to the open end. The trap is then placed with the base or bottom wall thereof on the stream bed, preferably shallow slowly running streams, the minnows of course having ready and easy access into the body through the plurality of hollow frusto-conical elements.

It is to be understood, of course, that the trap should not be used in either swift running or muddy streams and the reasons therefor are believed to be clearly apparent.

While I have referred to clear slow running streams, it is believed manifest that the trap may be used in moss or rock bottom ponds, lily pads, willow roots or, in other words, in any water body where it is possible to see the minnows feeding. It is, of course, possible to adapt the trap to be used in deep water and this can be accomplished by attaching a cord around the neck of the trap, sealing the closure cap and immersing the end of the trap floating approximately two inches above the water level.

Accordingly, an important object of the invention is to provide a minnow trap which may be readily employed in either still water or deep water and which includes relatively few, essential parts and which may be inexpensively and easily manufactured.

A further object of the invention is to provide a minnow trap having means incorporated therewith for permitting the minnow to gain access to the interior of the trap through several different paths, the access permitting means also serving to prevent the minnows from leaving the trap.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
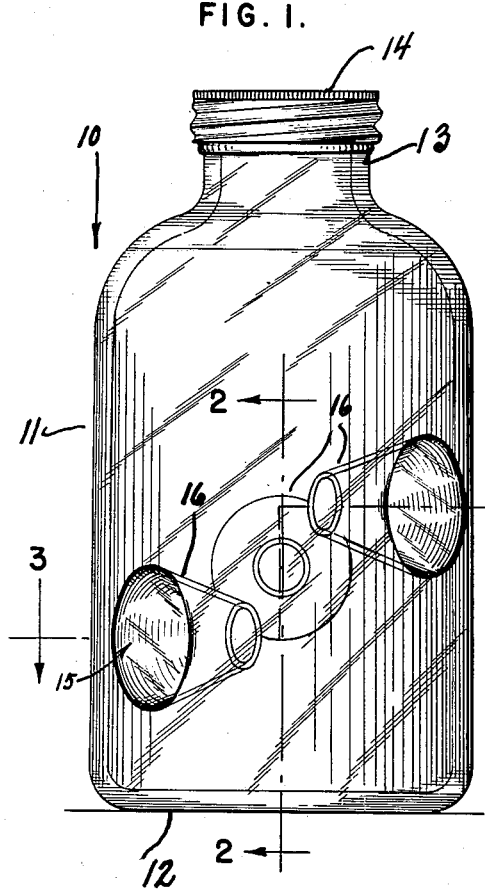
Figure 1 is an elevational view of the minnow trap embodying the present invention.
Figure 2:
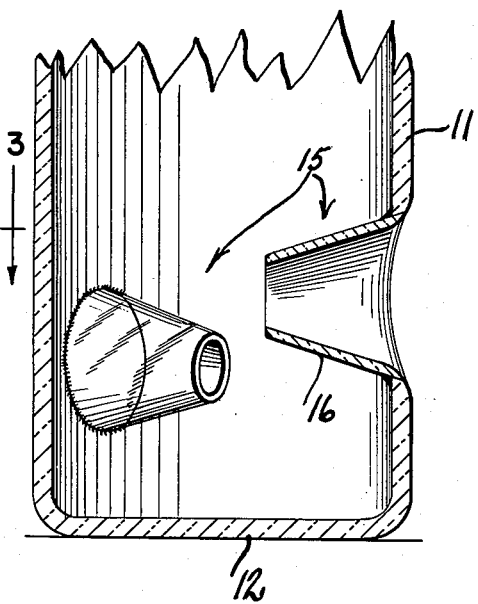
Figure 2 is a partial sectional view taken along the line 2—2 of Figure 1, the view looking in the direction of the arrows.
Figure 3:
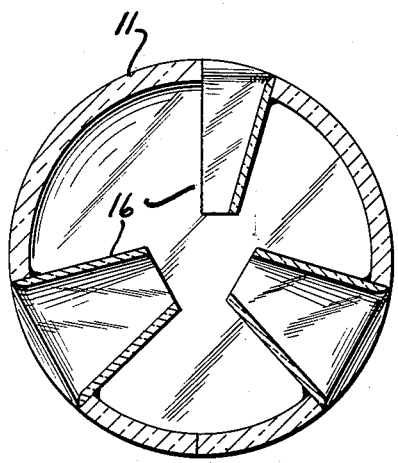
Figure 3 is a sectional view taken along the line 3—3 of Figure 1, the view looking in the direction of the arrows.

As shown in Figure 1, the trap 10 comprises a transparent body portion 11 having a closed lower wall 12, an open upper end 13, preferably provided with screw threads for receiving complemental threads provided in a closure cap 14 for sealing the body portion 11.

The wall of the body portion is provided with a plurality of strategically located entrance pathways denoted generally 15, providing several different means of access whereby the minnows may enter the interior of the body portion 11. It can be seen that each pathway is defined by a hollow frusto-conical element 16 and the inner or smaller end of each frusto-conical element is located at a different horizontal plane, as shown in Figure 1. By this arrangement a tortuous or circuitous path is defined within the body portion 11, thereby making it very difficult for minnows which have entered the body portion to find exit therefrom through the frusto-conical elements. Furthermore, the frusto-conical elements are integral with the wall of the body portion whereby the entire trap, with the exception of the closure cap, may be made in a single step.

The trap is preferably of a one gallon capacity and is made of glass, although it is to be understood that the body portion may be of a lesser or greater capacity and additional frusto-conical elements may be present in the wall, so long as such additional frusto-conical elements are arranged in a staggered relationship.

In employing the trap, a suitable bait such as, for instance, oatmeal, bread crumbs or cracker crumbs, is placed on the lower wall 12, after which the closure cap 14 is applied to the upper end 13. If the trap is to be used in shallow, slow running streams and the like, the lower wall 12 is placed on the stream bed, with the frusto-conical elements 16 submerged the water will enter the interior of the body portion 11 through the pathways 15. A fisherman can observe the number of minnows entrapped and when a sufficient number have been trapped, the device may be removed from the stream.

In the event the stream is of substantial depth, a cord or other retaining member (not shown) may be secured around the neck portion of the trap and the trap can then be suspended in the water.

In lieu of the use of a retaining cord, the closure cap can be drawn up sufficiently on the neck to seal the cap and the trap when introduced into deep water will float, with the upper end of the trap approximately two inches above the water level.

This invention is not to be confined to any strict conformity with the showing in the drawing, but may be changed or modified so long as such changes or modifications mark no material departure from the salient fea-

I claim:

A minnow trap for use in still water comprising an elongated hollow transparent body portion provided with a closed end and an open end diametrically opposite the closed end, a detachable cap closing the open end, the said body portion being provided with a plurality of openings of substantial diameter located at equally spaced intervals about the perimeter of the body portion with the openings located in different planes with respect to the longitudinal axis of the body portion and, spaced from the cap-closed end sufficiently to trap a volume of air under the cap closure to float the trap when the trap is placed in water and a hollow frusto-conical element in communication with each opening with the smaller end of each hollow frusto-conical element extending a substantial distance into the body portion to define separate entrances into the body portion about the entire perimeter of the body portion, the smaller ends of the hollow frusto-conical element being in different planes with respect to the longitudinal axis of the body portion providing a circuitous path within the body portion thereby making exit from the body portion difficult for minnows having entered the body portion.

References Cited in the file of this patent

UNITED STATES PATENTS

| | | |
|---|---|---|
| 427,049 | Cochennour | May 6, 1890 |
| 1,011,347 | Humpal | Dec. 12, 1911 |
| 1,085,599 | Frost | Feb. 3, 1914 |
| 1,772,729 | Pisani | Aug. 12, 1930 |